United States Patent

Popov

[11] Patent Number: 6,120,254
[45] Date of Patent: Sep. 19, 2000

[54] JET PUMP FOR CREATING THE VACUUM CONDITIONS REQUIRED FOR LIQUID PRODUCT DISTILLATION

[76] Inventor: Serguei A. Popov, 4615 Post Oak Pl., Suite 140, Houston, Tex. 77027

[21] Appl. No.: 09/194,414

[22] PCT Filed: Mar. 30, 1998

[86] PCT No.: PCT/RU98/00096

§ 371 Date: Nov. 30, 1998

§ 102(e) Date: Nov. 30, 1998

[87] PCT Pub. No.: WO98/44263

PCT Pub. Date: Oct. 8, 1998

[30] Foreign Application Priority Data

Mar. 31, 1997 [RU] Russian Federation ............. 97105014

[51] Int. Cl.[7] ...................................................... F04F 5/00
[52] U.S. Cl. .......................... 417/151; 417/76; 417/313; 95/176; 96/194
[58] Field of Search ............................ 417/313, 76, 151; 95/176, 177; 96/194, 181

[56] References Cited

U.S. PATENT DOCUMENTS

| | | | |
|---|---|---|---|
| 2,680,709 | 6/1954 | Skinner | 6/195.4 |
| 3,796,640 | 3/1974 | Boomer | 417/313 |
| 4,542,196 | 9/1985 | Morris et al. | 526/64 |
| 4,855,524 | 8/1989 | Harandi et al. | 585/517 |
| 5,015,359 | 5/1991 | Harandi et al. | 208/58 |
| 5,214,157 | 5/1993 | Healy et al. | 549/250 |
| 5,327,735 | 7/1994 | Hatton | 62/292 |

FOREIGN PATENT DOCUMENTS

| | | |
|---|---|---|
| 0783910 | 7/1997 | European Pat. Off. |
| 1050498 | 8/1959 | Germany |
| 2048156 | 11/1995 | Russian Federation |
| 2094070 | 10/1997 | Russian Federation |
| 559098 | 7/1977 | U.S.S.R. |
| 1733714 | 5/1992 | U.S.S.R. |

*Primary Examiner*—Charles G. Freay
*Assistant Examiner*—Robert Z. Evora
*Attorney, Agent, or Firm*—Mark A. Oathout

[57] ABSTRACT

The invention pertains to the field of fluidics and jet technology. The essence of the invention: is a vacuum-producing device composed of a liquid-gas jet apparatus, a separator and a pump, is furnished with a jet pump, so that the gas inlet of the liquid-gas jet apparatus is connected to a pipeline for discharge of vapors from a rectification column, the liquid inlet of the liquid-gas jet apparatus is connected to the discharge side of the pump, the outlet of the liquid-gas jet apparatus is connected to the separator, the passive medium inlet of the jet pump is connected to the separator, the outlet of the jet pump is connected to the suction side of the pump, the active nozzle of the jet pump is connected to a pipeline for export of a liquid fraction from the rectification column. This vacuum system results in increased efficiency and productivity.

3 Claims, 1 Drawing Sheet

JET PUMP FOR CREATING THE VACUUM CONDITIONS REQUIRED FOR LIQUID PRODUCT DISTILLATION

BACKGROUND OF THE INVENTION

The invention relates to the field of oil processing and the petrochemical industry, mainly to installations for the vacuum distillation of liquid products, crude oil for example. It and can be used particularly for the rectification of oil stock.

A vacuum system for crude oil rectification, which exploits a water steam ejector for producing a vacuum in a vacuum rectification column, is known (see U.S. Pat. No. 2,680,709, cl. 202–204, 1954).

Waste water with emulsified impurities of petroleum derivatives is formed as a result of operation of this system. Such waste water is environmentally dangerous and its purification from petroleum emulsions is a complex technical problem, requiring significant expenses.

The authors have chosen the pumping-ejector vacuum unit for distillation of liquids disclosed in RU patent No. 2048156 (M cl.$^6$ B 01 D 3/10, 1995) as the starting point for the present invention. This unit comprises

- a vacuum rectification column with pipelines for feed of a stock product, for discharge of vapors and for export of a liquid fraction;
- a vacuum-producing device composed of a liquid-gas jet apparatus, a separator and a pump.

In operation of this system, evacuation of vapors from the rectification column is carried out by the liquid-gas jet apparatus. The liquid-gas jet apparatus uses the liquid fraction from the rectification column as an active medium. Use of such unit substantially reduces the environmental discharge of ecologically harmful refinery waste.

The main imperfection of this system is the low efficiency of the vacuum-producing device since there is no makeup of the motive liquid during operation and the motive liquid is saturated in a short time by impurities, which negatively affect performance of the liquid-gas jet apparatus.

SUMMARY OF THE INVENTION

The technical problem to be solved by the present invention is an increase in the efficiency and productivity of the vacuum system by providing optimum conditions for the makeup of the motive liquid of the vacuum-producing device.

The problem is solved as follows. A pumping-ejector vacuum system for distillation of a liquid product, comprising a vacuum rectification column with pipelines for feed of a stock product, for discharge of vapors and for export of a liquid fraction, and a vacuum-producing device composed of a liquid-gas jet apparatus, a separator and a pump, is furnished with a jet pump. The jet pump is a component of the vacuum-producing device, in that the gas inlet of the liquid-gas jet apparatus is connected to the pipeline for discharge of vapors, the liquid inlet of the liquid-gas jet apparatus is connected to the discharge side of the pump, the outlet of the liquid-gas jet apparatus is connected to the separator, the gas outlet of the separator is connected to consumers of compressed gas, the outlet of the jet pump is connected to the suction side of the pump, the passive medium inlet of the jet pump is connected to the separator, and the active nozzle of the jet pump is connected to the pipeline for export of a liquid fraction from the rectification column. Additionally, the vacuum-producing device is furnished with an additional pump. The suction side of this additional pump is connected to the separator and the discharge side of this pump is connected to the active nozzle of the jet pump. The liquid outlet of the separator is connected to the pipeline for export of the liquid fraction from the rectification column.

The installation of the jet pump at the separator's liquid outlet and the connection of the jet pump to the pipeline for export of the liquid fraction from the rectification column provides for an adjustable and controllable process of mixing of the motive liquid and the liquid fraction from the rectification column. It is preferable to place the jet pump closer to the liquid outlet of the separator. It is also preferable to arrange delivery of the liquid fraction from the rectification column into the active nozzle of the jet pump as a medium for makeup of the motive liquid. This allows not only for refreshing of the motive liquid, but also for boosting the pressure of the motive liquid at the pump inlet. This gives the user the option and possibility to either decrease the required power input of the pump and energy consumption respectively, or to increase the head pressure of the motive liquid in the nozzle of the liquid-gas jet apparatus and, thereafter, to increase the vapor evacuation capability of the liquid-gas jet apparatus. Additionally, feeding of the liquid fraction into the jet pump reduces hydraulic losses during mixing of the liquid fraction with the motive liquid and, in turn, ensures more effective utilization of the motive liquid energy for compression of non-condensable components of the evacuated vapors. As a result, it is possible to deliver compressed gas from the separator to consumers under higher pressure while power consumption of the vacuum-producing device remains the same.

Additionally, in order to extend the range of working pressures of the jet apparatus and the separator, it is expedient to arrange a hydro lock between the jet apparatus and the separator. The hydro lock hydraulically isolates the jet apparatus from the separator and ensures more reliable and stable operation of the vacuum-producing device.

The necessity for the hydro lock may be explained by the fact that in a number of cases it is necessary to maintain a decreased pressure in the separator in order to intensify gas separation. However, the decreased pressure in the separator results in unstable operation of the jet apparatus due to disturbance of the hydrodynamic balance between the two units. Unstable work of the jet apparatus worsens the condensation of easy-condensable components in the motive liquid.

BRIEF DESCRIPTION OF THE DRAWINGS

The drawing in FIG. 1 represents a schematic diagram of a vacuum system for distillation of a liquid product.

DETAILED DESCRIPTION OF THE INVENTION

Figure 1:
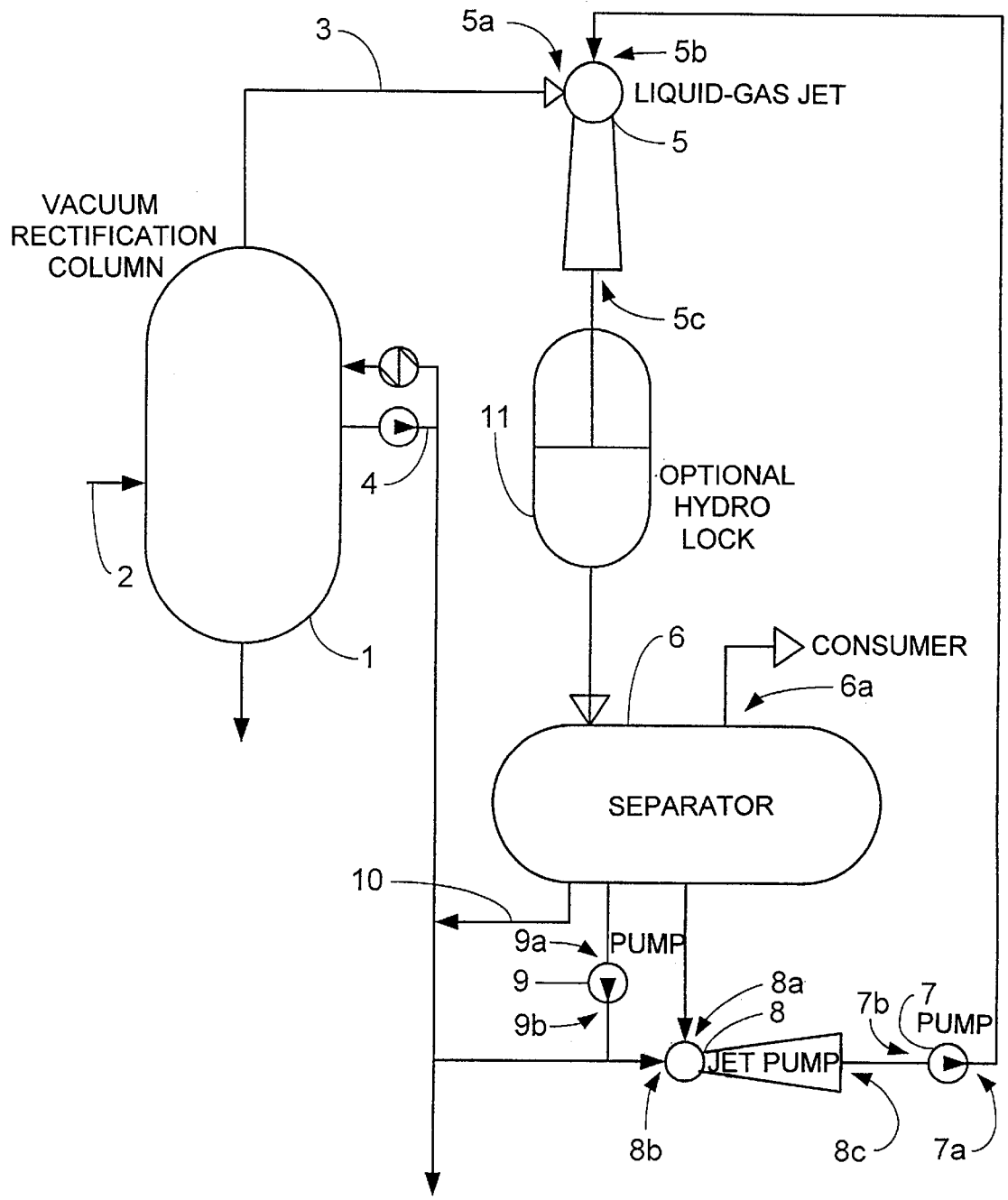

The pumping-ejector vacuum system for distillation of a liquid product comprises

- a vacuum rectification column 1 with a pipeline 2 for feed of a stock product, a pipeline 3 for discharge of vapors and at least one pipeline 4 for export of a liquid fraction; and
- a vacuum-producing device having a liquid-gas jet apparatus 5, a separator 6 and a pump 7.

The vacuum-producing device is furnished with a jet pump 8. The gas inlet 5a of the liquid-gas jet apparatus 5 is connected to the pipeline 3 for discharge of vapours, the liquid inlet 5b of the liquid-gas jet apparatus 5 is connected to the discharge side 7a of the pump 7 and the outlet 5c of the liquid-gas jet apparatus 5 is connected to the separator 6. The gas outlet 6a of the separator 6 is connected to consumers of compressed gas. The outlet 8c of the jet pump 8 is connected to the suction side 7b of the pump 7. The passive medium inlet 8a of the jet pump 8 is connected to the separator 6. An active nozzle inlet 8b of the jet pump 8 is connected to the pipeline 4 for export of a liquid fraction from the rectification column 1. The vacuum-producing device can be furnished with an additional pump 9, connected to the separator 6 by its suction side 9a and to the active nozzle inlet 8b of the jet pump 8 by its discharge side 9b A liquid outlet 10 of the separator 6 can be connected to the pipeline 4 for export of a liquid fraction from the rectification column 1. Optionally, the system can be furnished with a hydro lock 11 installed between the outlet 5c of the jet apparatus 5 and the separator 6.

The vacuum system operates as follows:

A stock product flows through the pipeline 2 into the vacuum rectification column 1, where the stock product is separated during distillation into vapors and at least one liquid fraction. The vapors are evacuated from the column 1 through the pipeline 3 by the liquid-gas jet apparatus 5. The liquid fraction is bled from the column 1 through the pipeline 4. Motive liquid from the outlet 8c of the jet pump 8 is delivered by the pump 7 into the active nozzle 5b of the liquid-gas jet apparatus 5. Evacuation of the vapors from the pipeline 3 occurs during outflow of the motive liquid from the nozzle (not shown) of the jet apparatus 5. Thus a vacuum in the column 1 is provided. The motive liquid mixes with the vapors in the jet apparatus 5. Partial condensation of easy-condensable components of the vapors and compression of its non-condensable gaseous components occur during the mixing of mediums in the jet apparatus 5. The gas-liquid mixture passes from the jet apparatus 5 into the separator 6, where the liquid medium constituting a mixture of the motive liquid and condensed components of the vapors is separated from the compressed gaseous medium representing the non-condensable components of the vapors compressed in the jet apparatus 5. A part of the motive liquid is discharged from the separator 6 through the outlet 10 and is then delivered through the pipeline 4 to consumers as the final product of the rectification column 1. The remaining part of the motive liquid may be delivered to the passive medium inlet 8a of the jet pump 8. Simultaneously, the liquid fraction from the rectification column 1 is delivered through the pipeline 4 into the active nozzle inlet 8b of the jet pump 8. An adjustable and controllable mixing of the motive liquid from the separator 6 and the liquid fraction from the pipeline 4 is ensured in the jet pump 8 (for example, by cocks installed on appropriate pipelines; not shown on the diagram). The liquid fraction flowing under pressure from the active nozzle (not shown) of the jet pump 8 entrains the motive liquid from the separator 6 into the jet pump. A part of the kinetic energy of the liquid fraction is transferred to the motive liquid during mixing of these two mediums in the jet pump 8. The foregoing allows feeding of the pump 7 by a pressurized homogeneous mixture of liquids formed with minimum hydraulic losses.

As far as the liquid fraction from the column 1 is used for makeup of the motive liquid of the vacuum-producing device, the surplus amount of the motive liquid (equivalent to the amount of liquid fraction intake) is discharged from the separator 6 through the liquid outlet 10 for further processing.

In some cases (for example, in case of pressure fluctuations in the separator 6 or in case of a relatively low or relatively high pressure in the separator), availability of a hydro lock 11 between the jet apparatus 5 and the separator 6 is expedient. This measure enables one to create and to maintain the vacuum in the rectification column 1 without disturbance of the operating regime of the vacuum system.

The present invention can be used in those technological processes and in those industries, where distillation of a liquid stock product under vacuum is required.

What is claimed is:

1. A pumping-ejector vacuum system for distillation of a liquid product, comprising:
   a vacuum rectification column having:
      a first pipeline for feed of a stock product,
      a second pipeline for discharge of vapors, and,
      a third pipeline for export of at least one liquid fraction, and,
   a vacuum-producing device comprising:
      a liquid-gas jet apparatus,
      a separator;
      a pump, and,
      a jet pump,
         the liquid-gas jet apparatus further includes:
            a gas inlet connected to the second pipeline,
            a liquid inlet connected to a discharge side of the pump, and,
            an outlet connected to the separator,
         said jet pump further includes:
            a passive medium inlet connected to the separator,
            an outlet connected to a suction side of the pump, and,
            an active nozzle inlet connected to the third pipeline.

2. The pumping-ejector vacuum system according to claim 1, further including:
   a second pump, wherein
      a suction side of said second pump is connected to the separator,
      a discharge side of said second pump is connected to the active nozzle inlet of said jet pump, and
      a liquid outlet of the separator is connected to the third pipeline.

3. The pumping-ejector vacuum system according to claim 1, further including a hydro lock, placed between the outlet of the liquid-gas jet apparatus and the separator.

* * * * *